United States Patent [19]

Scholten et al.

[11] Patent Number: 4,576,833

[45] Date of Patent: Mar. 18, 1986

[54] METHOD OF FORMING A LUMINESCENT LAYER ON A CARRIER AND LOW-PRESSURE MERCURY VAPOR DISCHARGE LAMP HAVING A LAYER APPLIED TO A CARRIER BY MEANS OF SUCH A METHOD

[75] Inventors: Pieter C. Scholten; Ronald K. Eijnthoven, both of Eindhoven, Netherlands

[73] Assignee: U.S. Philips Corporation, New York, N.Y.

[21] Appl. No.: 663,605

[22] Filed: Oct. 22, 1984

[30] Foreign Application Priority Data

Oct. 26, 1983 [NL] Netherlands ............... 8303685

[51] Int. Cl.$^4$ .................. H01J 61/35; H01J 61/46
[52] U.S. Cl. .................... 427/67; 313/565; 427/73

[58] Field of Search ............ 427/67, 73; 313/565; 106/286.5

[56] References Cited

U.S. PATENT DOCUMENTS

| | | | |
|---|---|---|---|
| 2,915,475 | 12/1959 | Bugosh | 106/286.5 X |
| 3,031,418 | 4/1962 | Bugosh | 106/286.5 X |
| 4,230,741 | 10/1980 | Yamazaki et al. | 427/67 |

Primary Examiner—James R. Hoffman
Attorney, Agent, or Firm—Norman N. Spain

[57] ABSTRACT

A method of forming a luminescent layer on a glass carrier (such as the wall of a discharge vessel of a low-pressure mercury vapor discharge lamp) from a suspension of grains of a luminescent material and a quantity of binder in a suspension medium. According to the invention, the suspension medium preferably consists of water and the binder mainly comprises fibrous crystals of boehmite.

3 Claims, 1 Drawing Figure

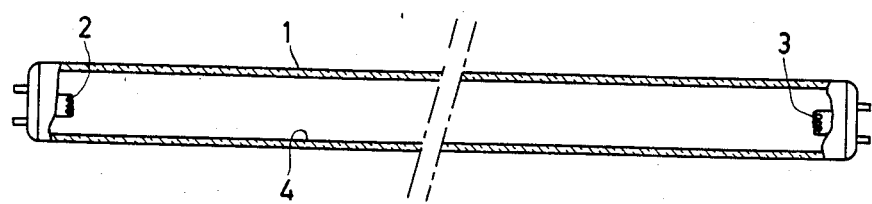

METHOD OF FORMING A LUMINESCENT LAYER ON A CARRIER AND LOW-PRESSURE MERCURY VAPOR DISCHARGE LAMP HAVING A LAYER APPLIED TO A CARRIER BY MEANS OF SUCH A METHOD

BACKGROUND OF THE INVENTION

The invention relates to a method of forming a luminescent layer on a glass carrier from a suspension of grains of a luminescent material and a quantity of a binder in a suspension medium, which suspension is contacted with the carrier in such a manner that a layer of the suspension adheres to the carrier, the non-adherent suspension residue is removed and the layer adhered to the carrier is dried. Such a method is known from German Patent Specification 1,184,009.

The invention further relates to low-pressure mercury vapour discharge lamps which comprise a layer applied to a carrier by means of such a method.

Finally, the invention relates to a method of preparing the binder.

The method is used in the manufacture of a luminescent screen, such as is utilized, for example, in cathode-ray tubes and high-pressure- or low-pressure mercury vapour discharge lamps. It is then of major importance that the luminescent layer, which comprises a large quantity of grains of luminescent material, should be very homogeneous and should adhere very strongly to the glass carrier, such as the wall of the discharge vessel of a lamp.

The aforementioned German Patent Specification discloses a method of manufacturing a low-pressure mercury vapour discharge lamp having a tubular discharge vessel whose inner wall is provided with a luminescent layer by means of a suspension comprising luminescent grains and a binder. As suitable binders, there are mentioned in the said Patent Specification inter alia polyethylene oxide dissolved in water and nitrocellulose dissolved in butyl acetate or alcohol. After a layer has been applied, it is dried with the suspension medium evaporating. Subsequently, the discharge vessel is heated, the binder being decomposed and escaping in the form of gaseous products.

The heat treatment is not only a time-consuming additional step in the process of manufacturing the lamp (as a result of which additional means, such as special sintering ovens, are necessary), but is also expensive due to the high energy consumption.

A large number of the binders mentioned in the said German Patent Specification suffer further from the limitation that they are only soluble in particular organic liquids. Especially during the drying process, additional measures are then often required to prevent these solvents (which are often toxic and combustible) from reaching the working space or the environment after evaporation.

SUMMARY OF THE INVENTION

The invention has for its object to provide a method for forming a luminescent layer on a glass carrier, in which method such a binder is used that the disadvantages inherent in the use of the said known binders are avoided or occur to a much smaller extent.

According to the invention, a method of the kind mentioned in the opening paragraph is therefore characterized in that the binder mainly comprises fibrous crystals of boehmite up to at most 7% by weight measured with respect to the quantity of luminescent material.

In the method according to the invention, after drying the luminescent layer, binder crystals are left between the grains of the luminescent material. Special steps for burning off the binder are not necessary in this method. In low-pressure mercury vapour discharge lamps, in which a luminescent layer is formed on the inner wall of the discharge vessel by means of this method, it has been found that the light output is not influenced significantly by the presence of the binder between the luminescent grains. By means of the binder according to the invention, a very strong adherence is obtained both between the luminescent grains and between these grains and the glass wall of the carrier.

BRIEF DESCRIPTION OF THE DRAWINGS

The sole FIGURE in the drawing is a cross-sectional view of a low pressure mercury vapor discharge lamp employing the luminescent layer of the invention.

DETAILED DESCRIPTION OF THE INVENTION

Preferably, water is used as the suspension medium for the binder, as a result of which problems inherent in the use of organic solvents are avoided.

The quantity of binder in the suspension medium is small; preferably the quantity is at most 7% by weight measured with respect to the quantity of luminescent material. It has been found that with a quantity larger than 7% by weight the light output decreases after a number of operating hours in a low-pressure mercury vapour discharge lamp in which the discharge vessel is provided with a luminescent layer formed by means of the method. With a quantity less than about 0.1% so substantial binding effect was present.

A method in accordance with the invention suitable for preparing long acicular boehmite crystals, which can be very advantageously used in the method of forming luminescent layer on a glass carrier, is characterized in that a suspension of basic aluminum acetate (AlO-HAc$_2$) in water is agitated at a temperature of 95° C.±5%C. It has been found that after about 72 hours the starting material is converted substantially completely (more than 95%) into boehmite.

According to an example of preparation, 22.5 g of basic aluminum acetate, 225 ml of water and an agitator magnet are introduced into a glass bottle of 250 ml. The bottle is kept in a drying stove at a temperature of approximately 95° C., whle the contents are stirred continuously b a magnetic agitator.

After 72 hours, the white suspension is converted quantitatively into a weakly turbid sol. The pH of this sol is 3.1 and the boehmite content calculated as $Al_2O_3$ is 3.6%.

This method of preparation has the advantage in comparison with preparation methods already known that it is possible to work at atmospheric pressure. Hitherto, the conversion is possibly only in an autoclave or by means of a harmful starting material.

The invention will be described more fully with reference to the drawing, which shows diagrammatically, partly in sectional view, a low-pressure pressure mercury vapour discharge lamp manufactured by means of the method according to the invention.

In the drawing, the low-pressure mercury vapour discharge lamp is represented with a glass tubular discharge vessel at whose ends electrodes 2 and 3 are arranged. During operation of the lamp, a discharge is maintained between these electrodes. The discharge vessel contains mercury and a rare gas, such as argon, at a pressure of approximately 400 Pa. The inner wall 4 of the discharge vessel 1 is provided with a luminescent layer which is formed by means of the method according to the invention.

The luminescent material (which is an embodiment consists of green-luminescing terbium-activated cerium magnesium aluminate) is first suspended in water containing acicular boehmite crystals (3.0% by weight measured with respect to the quantity of luminescent material) as a binder. The suspension of medium is water. The suspension is contacted with the inner wall of a tube which is arranged in a vertical position, for example, by spraying from above.

A homogenous thin layer is formed on the inner wall of the tube and the non-adherent suspension flows out of the tube. It has been found that the flow properties of the suspension are favourable due to the suitable choice of the boehmite concentration and the degree of acidity in this process. Subsequently, the layer adhered to the wall is dried and the tube is heated to approximately 400° C. in order to cause the water still present in the layer to evaporate. The electrodes are then arranged, the lamp is "pumped" (that is to say the steps of annealing and degassing of the electrodes and other parts of the lamp, the creation of the correct rare gas atmosphere etc. are carried out) and the discharge vessel is sealed in a vacuum-tight manner. Mercury is then introduced into the discharge vessel by means of a method as described in GB-PS 1.475.458. In the embodiment, 100 gms of aqueous suspension were present, containing 40 gms of luminescent material and 1.2 gms of boehmite (3.0% by weight with respect to the quantity of luminescent material).

The luminous output of a lowpressure mercury vapour discharge lamp (40W) manufactured with help of the above method was about 3500 lm, with a luminescent material consisting of a mixture of three phosphors present on the inner wall of the discharge vessel. Said phosphors were green luminescing terbium activated cerium magnesium aluminate, blue luminescing bivalent europium activated barium magnesium aluminate and red luminescing trivalent europium activated yttrium oxide (colour temp. approx. 4000 k.).

What is claimed is:

1. A method of forming a layer of luminescent material on a glass carrier from a suspension of grains of luminescent material in a colloidal solution of a binder in a suspension medium, which suspension is contacted with the carrier in such a manner that a layer of suspension adheres thereto, the non-adherent residue of suspension is removed and the layer adhered to the carrier is dried, characterized in that the binder mainly comprises fibrous boehmite crystals up to at most 7% by weight measured with respect to the quantity of luminescent material present in the suspension.

2. A method as claimed in claim 1, characterized in that the suspension medium consists mainly of water.

3. A low-pressure mercury vapour discharge lamp comprising a discharge vessel provided with a luminescent layer by means of the method claimed in claim 1.

* * * * *